United States Patent
Bakker

(10) Patent No.: US 10,773,566 B2
(45) Date of Patent: Sep. 15, 2020

(54) SUSPENSION WITH ACTIVE DAMPING TO TUNE CASTER DYNAMICS

(71) Applicant: Rivian IP Holdings, LLC, Plymouth, MI (US)

(72) Inventor: Chass Bakker, Clarkston, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 179 days.

(21) Appl. No.: 16/005,080

(22) Filed: Jun. 11, 2018

(65) Prior Publication Data
US 2019/0375260 A1 Dec. 12, 2019

(51) Int. Cl.
| | | |
|---|---|---|
| *B60G 17/016* | (2006.01) | |
| *B60G 3/20* | (2006.01) | |
| *B60G 17/019* | (2006.01) | |
| *B62D 7/18* | (2006.01) | |
| *B62D 17/00* | (2006.01) | |

(Continued)

(52) U.S. Cl.
CPC ......... *B60G 17/0164* (2013.01); *B60G 3/207* (2013.01); *B60G 17/019* (2013.01); *B62D 7/18* (2013.01); *B62D 17/00* (2013.01); *B60G 15/02* (2013.01); *B60G 17/021* (2013.01); *B60G 2200/18* (2013.01); *B60G 2202/12* (2013.01); *B60G 2202/312* (2013.01); *B60G 2204/62* (2013.01); *B60G 2500/10* (2013.01)

(58) Field of Classification Search
CPC ............................ B62D 17/00; B62D 17/0164
See application file for complete search history.

(56) References Cited

U.S. PATENT DOCUMENTS

| | | | | |
|---|---|---|---|---|
| 5,048,860 A | * | 9/1991 | Kanai | B60G 3/205 |
| | | | | 280/86.757 |
| 5,292,149 A | * | 3/1994 | Luger | B60G 3/26 |
| | | | | 280/5.521 |
| 5,839,749 A | | 11/1998 | Lyu | |

(Continued)

FOREIGN PATENT DOCUMENTS

| | | |
|---|---|---|
| EP | 2161147 | 3/2010 |
| JP | S63159116 | 7/1988 |

(Continued)

OTHER PUBLICATIONS

International Search Report for International Application PCT/US2019/036452, dated Oct. 25, 2019.

*Primary Examiner* — Nicole T Verley
(74) *Attorney, Agent, or Firm* — Clements Bernard Walker

(57) ABSTRACT

A suspension assembly for a vehicle having a frame includes a control arm, knuckle, spring, damper, and control module. The control arm is pivotably coupled to the frame. The knuckle is coupled to the control arm and supports a wheel hub for rotation relative to the knuckle. The spring is mounted between the frame and the control arm or the knuckle. The damper has an adjustable damping force and includes a first end mounted to the frame and a second end mounted such that a change in caster angle of the knuckle extends or contracts the damper. The control module is in communication with the damper and configured to adjust a damping force of the damper based on an actual or predicted change in caster angle of the knuckle. The control module is configured to increase the damping force in a direction that resists a change in the caster angle.

20 Claims, 3 Drawing Sheets

(51) Int. Cl.
*B60G 15/02* (2006.01)
*B60G 17/02* (2006.01)

(56) References Cited

U.S. PATENT DOCUMENTS

| | | | | |
|---|---|---|---|---|
| 5,975,541 | A * | 11/1999 | Harara | F16F 13/28 |
| | | | | 280/5.524 |
| 8,973,929 | B1 * | 3/2015 | Seo | B60G 15/068 |
| | | | | 280/86.752 |
| 9,216,625 | B2 * | 12/2015 | Ramirez Ruiz | B60G 7/003 |
| 10,112,649 | B2 * | 10/2018 | Rogers | B60G 7/006 |
| 10,556,474 | B2 * | 2/2020 | Andou | B60G 3/20 |
| 2008/0183353 | A1 | 7/2008 | Post et al. | |
| 2014/0005889 | A1 | 1/2014 | Hayakawa | |
| 2016/0272032 | A1 | 9/2016 | Nedachi | |

FOREIGN PATENT DOCUMENTS

| | | | | |
|---|---|---|---|---|
| JP | H10217735 | | 8/1998 | |
| WO | WO-2009101218 | A2 * | 8/2009 | B62D 17/00 |

* cited by examiner

SUSPENSION WITH ACTIVE DAMPING TO TUNE CASTER DYNAMICS

FIELD

The present invention relates generally to a vehicle suspension and more specifically to a vehicle suspension with active damping configured to tune caster dynamics.

BACKGROUND

The statements in this section merely provide background information related to the present disclosure and may not constitute prior art.

Caster angle is one vehicle characteristic that can impact vehicle handling and ride comfort. Caster angle is generally defined by the angle, when viewed perpendicular to the side of the vehicle, between an axis perpendicular to the ground at the contact patch of a vehicle wheel and a real or virtual kingpin axis. When referring to a steerable wheel (e.g., front wheel of a front wheel steering vehicle), the kingpin axis is the axis about which the wheel rotates when steering. When referring to a non-steerable wheel (e.g., a rear wheel of a front wheel steering vehicle), the kingpin axis can generally be the axis about which the wheel would tend to rotate when a force is applied perpendicular to the side of to the wheel. In some vehicle suspensions, the virtual kingpin axis is the axis between two joints (e.g., ball joints) that connect to the wheel knuckle to two control arms. In some other vehicle suspensions, the virtual kingpin axis is determined based on the combined geometry of multiple control arms or other links between the knuckle and the vehicle's frame. In some other suspensions, the virtual kingpin axis is perpendicular to the ground surface and extends from the contact patch through the center of the wheel.

Certain dynamic conditions and compliance in the suspension can cause the caster angle of a vehicle's knuckle to change from the preferred caster angle. For example, hard breaking or acceleration can cause the knuckle to rotate generally about the wheel's rotational axis, which changes the angle of the virtual kingpin axis relative to the road surface. This change is typically referred to as caster windup. In some situations, such caster windup can negatively impact the vehicle performance. For example, caster windup could cause the wheel to contact the body, or some suspension components to bottom out. Caster windup can also result in a change of camber and toe angle of the vehicle wheel.

In some suspensions, caster windup is limited by a rigid member, typically referred to as an integral link. The integral link typically extends between a location on the knuckle and a location on one of the control arms (e.g., the lower control arm). The integral link acts in tension or compression (depending on the rotational direction of the caster windup) to prevent caster angle change. Since the integral link is a rigid body, caster windup is typically limited to any compliance that may exist in the connections (e.g., bushings) between the integral link and the knuckle or the control arm.

However, the integral link adds additional weight, cost, complexity, and packaging constraints on the suspension design. Additionally, in some situations, it may be advantageous to adjust or tune the amount of permitted caster windup during operation of the vehicle.

Accordingly, these issues with caster windup are addressed by the present disclosure.

SUMMARY

In one form, a suspension assembly for a vehicle having a frame includes a control arm, a knuckle, a spring, a damper, and a control module. The control arm is pivotably coupled to the frame. The knuckle is coupled to the control arm and adapted to support a wheel hub for rotation relative to the knuckle. The spring is mounted between the frame and either the control arm or the knuckle. The damper has an adjustable damping force and includes a first end mounted to the frame and a second end mounted such that a change in caster angle of the knuckle extends or contracts the damper. The control module is in communication with the damper and configured to adjust a damping force of the damper based on an actual or predicted change in caster angle of the knuckle. The control module is configured to increase the damping force in a direction that resists a change in the caster angle.

According to a further form, the damper is disposed either forward or rearward of a kingpin axis of the suspension assembly.

According to a further form, one of the spring and the damper is disposed forward of the kingpin axis and the other of the spring and the damper is disposed rearward of the kingpin axis.

According to a further form, the second end of the damper is mounted to the knuckle.

According to a further form, the suspension assembly further includes a first sensor configured to detect a first characteristic of the vehicle. The control module is configured to receive a first signal representative of the first characteristic from the first sensor and to adjust the damping force of the damper based on the first characteristic.

According to a further form, the first characteristic is one of an acceleration of the vehicle, a deceleration of the vehicle, and a change in angular position of the knuckle relative to the frame.

According to a further form, the control module is configured to calculate the caster angle based on the first signal and at least one second characteristic of the vehicle.

According to a further form, the at least one second characteristic is one of a ride height and a length of the damper.

According to a further form, the suspension assembly further includes a second sensor configured to detect a length of the damper.

According to a further form, the suspension assembly further includes a toe link and a camber link. The toe link includes a first end mounted to the knuckle at a first location on the knuckle, a second end coupled to the frame, and a first rigid body extending between the first and second ends. The camber link includes a third end mounted to the knuckle at a second location on the knuckle, a fourth end coupled to the frame, and a second rigid body extending between the third and fourth ends. The control arm is mounted to the knuckle at a third location on the knuckle.

According to a further form, the second end of the damper is mounted to one of the control arm, the toe link, and the camber link.

According to a further form, the suspension assembly further includes a first bushing and a second bushing. The first and second bushings are mounted in a force transmission path between the knuckle and the frame and configured to provide the knuckle with a first degree of compliance in a first rotational direction and a second degree of compliance in a second direction. The first degree of compliance is greater than the second degree of compliance.

According to a further form, the first bushing is mounted to the knuckle and the second bushing is mounted to one of the control arm, a toe link, a camber link, and an integral link.

In another form, a suspension assembly for a vehicle having a frame includes a knuckle, a plurality of control arms, a spring, a damper, a first sensor, and a control module. The knuckle is adapted to support a wheel hub for rotation relative to the knuckle. Each control arm includes a first end coupled to the frame, a second end coupled to the knuckle, and a rigid body extending between the first and second ends of the control arm. The spring is mounted between the frame and either the knuckle or one of the control arms. The damper has an adjustable damping force and includes a first end coupled to the frame and a second end mounted to either the knuckle or one of the control arms such that a change in caster angle of the knuckle extends or contracts the damper. The first sensor is configured to detect a first characteristic of the vehicle and output a first signal representative of the first characteristic. The control module is in communication with the damper and the sensor. The control module is configured to receive the first signal and determine an actual or predicted change in caster angle of the knuckle based on the first characteristic. The control module is configured to increase a damping force of the damper in a direction that resists the change in caster angle.

According to a further form, the first characteristic is one of an acceleration of the vehicle, a deceleration of the vehicle, and a change in angular position of the knuckle relative to the frame.

According to a further form, the control module is configured to calculate the caster angle based on the first characteristic and at least one second characteristic of the vehicle.

According to a further form, the at least one second characteristic is one of a ride height and a length of the damper.

In another form, a vehicle includes a damper having an adjustable damping force and including one end coupled to a knuckle or a control arm such that a change in caster angle of the knuckle extends or contracts the damper. A method of controlling a caster angle of the knuckle includes detecting at a first sensor a first characteristic of the vehicle. The method includes receiving at a control module a first input from the first sensor. The first input is representative of the first characteristic. The method includes determining at the control module an actual or predicted change in caster angle of the knuckle based on the first input. The method includes adjusting a damping force of the damper in a direction that resists the actual or predicted change in caster angle.

According to a further form, adjusting the damping force of the damper includes increasing the damping force in a first direction that resists rotation of the knuckle away from a preferred caster angle and decreasing the damping force in a second direction that that permits rotational change of the knuckle toward the preferred caster angle.

According to a further form, determining the actual or predicted change in caster angle includes calculating the caster angle based on at least one of an acceleration of the vehicle, a deceleration of the vehicle, a change in angular position of the knuckle, and a length of the damper.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
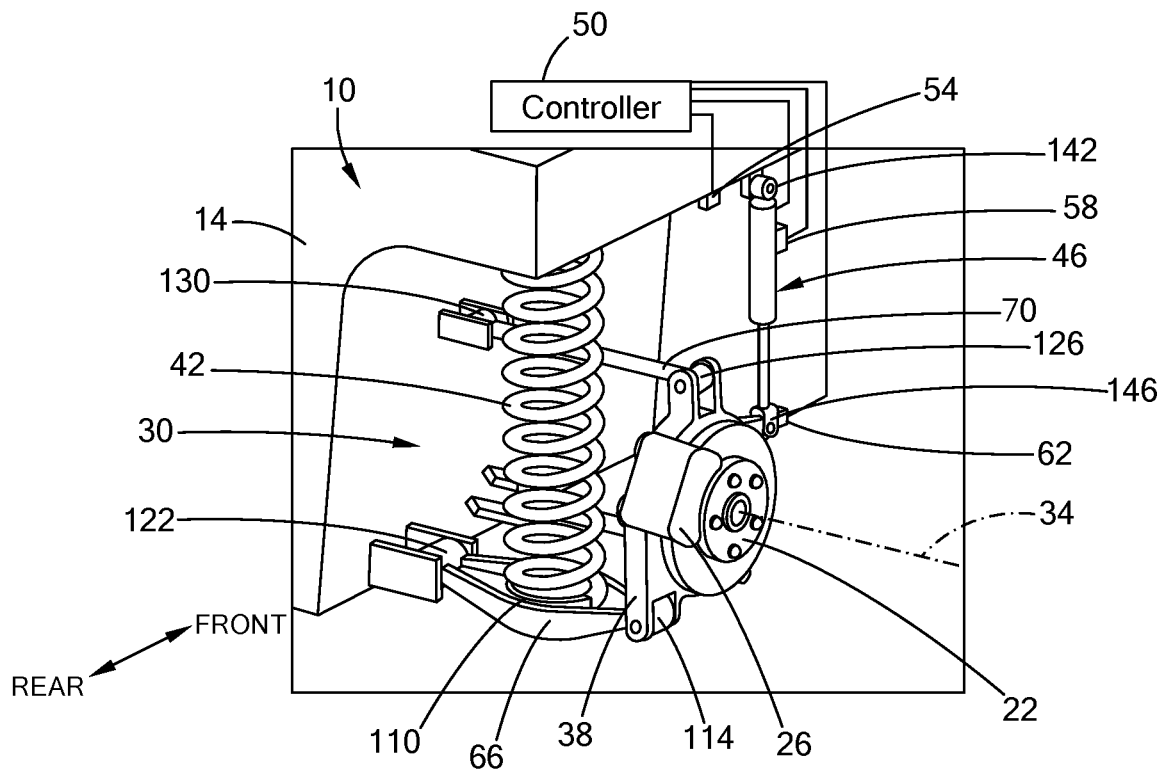
FIG. 1 is a front perspective view of a portion of a vehicle, illustrating an example suspension, in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
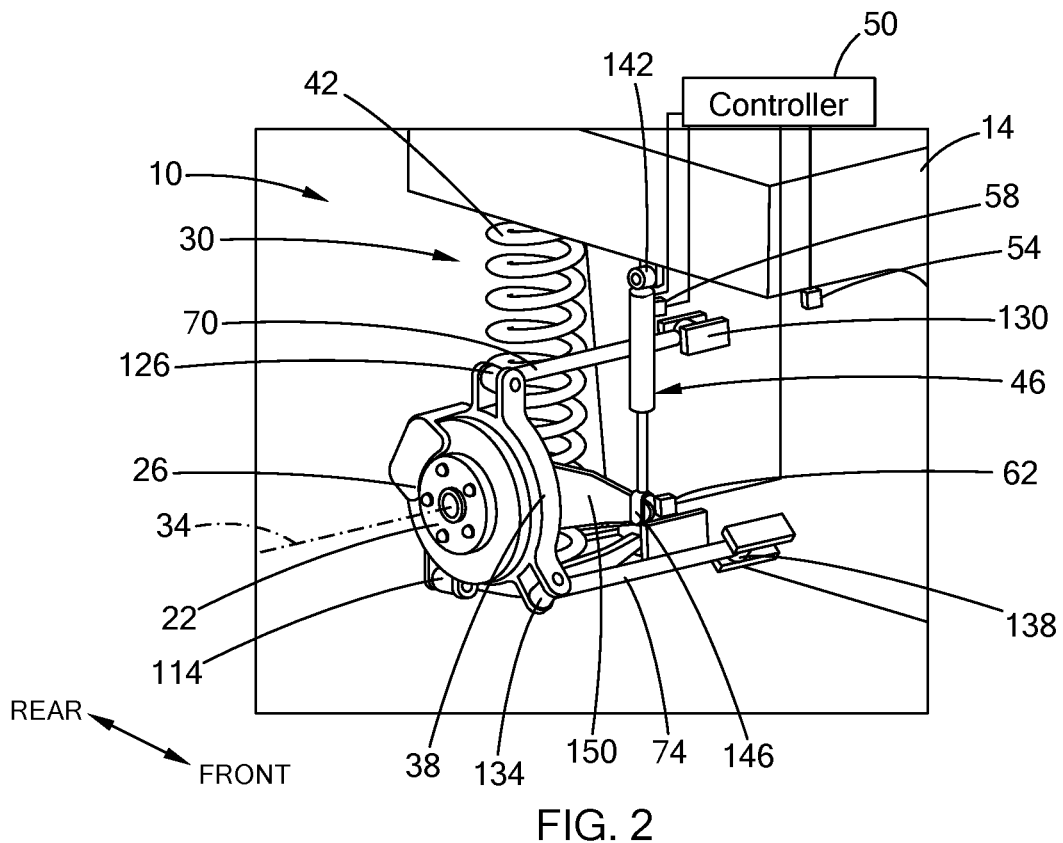
FIG. 2 is a rear perspective view of the vehicle and suspension of FIG. 1.
Figure 3:
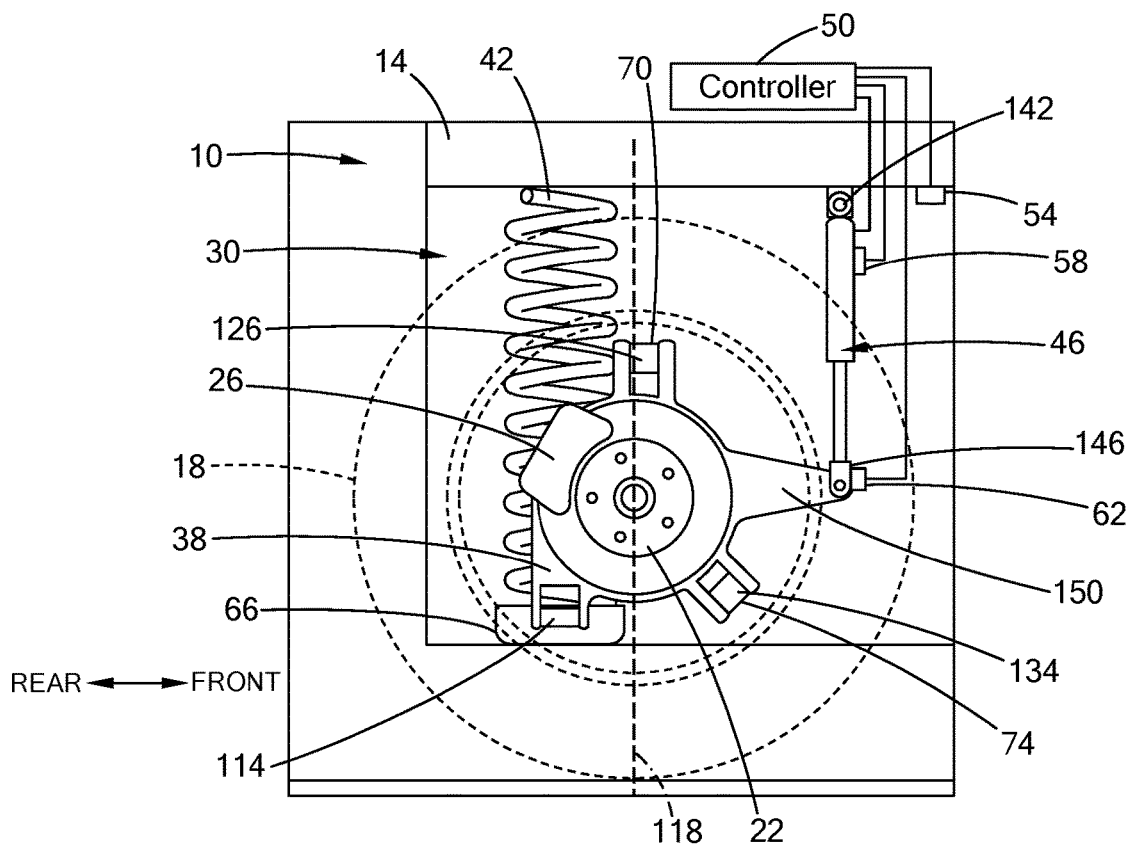
FIG. 3 is side view of the vehicle and suspension of FIG. 1.

With reference to FIGS. 1-3, a vehicle 10 (e.g., an automobile), includes a vehicle frame 14, a wheel 18 (shown in phantom lines in FIG. 3), a hub 22, a brake 26, and a suspension system 30. While only the right rear portion of the vehicle 10 is illustrated, it is understood that the left rear portion of the vehicle 10 can be similar to the right rear portion. While described herein with reference to the rear vehicle suspension, the teachings of the present disclosure can also apply to a front suspension.

The vehicle frame 14 can be any suitable type of vehicle frame (e.g., the frame of a body-on-frame vehicle, a subframe or structural feature of a unibody frame vehicle or of a monocoque frame vehicle). The wheel 18 (FIG. 3) is mounted to the hub 22 for common rotation with the hub 22 about the rotational axis 34 of the wheel. In the example provided, the hub 22 includes a plurality of lug studs that extend through bores in the wheel 18 (FIG. 3) and the wheel 18 (FIG. 3) is secured to the hub 22 by a plurality of lug nuts (not shown), though other configurations can be used. As used herein, the term "hub", encompasses both a driven hub that receives rotary power from a driveshaft (not shown) or a non-driven hub (also known as a spindle). The suspension system 30 generally couples the hub 22 to the frame 14 and supports the frame 14 relative to the hub 22 and wheel 18 (FIG. 3) as discussed in greater detail below. In the example provided, the brake 26 is a disc brake including a rotor coupled to the hub 22 for common rotation about the wheel axis 34 and a caliper configured to impart a braking force on the rotor to resist rotation of the wheel 18 (FIG. 3), though other configurations (e.g., drum brakes, air brakes, magnetic brakes, etc.) can be used.

The suspension system 30 includes a knuckle 38, a spring 42, a damper 46, a plurality of control arms, a control module 50. In the example provided, the suspension system 30 also includes a first sensor 54, a second sensor 58, a third sensor 62, and the plurality of control arms includes a lower control arm 66, an upper control arm (referred to herein as a camber link 70), and a second lower control arm (referred to herein as a toe link 74).

The knuckle 38 rotatably supports the hub 22 such that the hub 22 can rotate about the wheel axis 34 relative to the knuckle 38. In the example provided, the caliper of the brake 26 is coupled to the knuckle 38 such that the caliper is rotationally fixed relative to the knuckle 38, while the rotor can rotate with the hub 22. Accordingly, activation of the brake 26 resists rotation of the hub 22 and wheel 18 (FIG. 3) relative to the knuckle 38.

The plurality of control arms generally couple the knuckle 38 to the frame 14. In the example provided, the lower control arm 66 includes an inboard end, an outboard end, and a rigid body that extends between the inboard and outboard ends of the lower control arm 66 to define a spring perch 110. The outboard end of the lower control arm 66 is mounted to the knuckle 38 to form a first outboard joint 114 located at a first location on the knuckle 38. In the example provided, the first location on the knuckle 38 is located proximate to a bottom of the knuckle 38 and rearward of a center axis 118 (shown in FIG. 3) of the hub 22, though other configurations can be used. The outboard end of the lower control arm 66 is mounted to the knuckle 38 such that the knuckle 38 can pivot relative to the lower control arm 66. For example, the first outboard joint 114 can be a pivot joint or a ball joint and can include a first outboard bushing (not specifically shown) providing compliance in the first outboard joint 114. Thus, the first outboard joint 114 can pivotably couple the lower control arm 66 to the knuckle 38 so that the lower control arm 66 can pivot about one or more axes at the first outboard joint 114. The first outboard bushing (not specifically shown) can be configured to provide asymmetrical compliance such that the first outboard joint 114 can have more compliance in one direction than another direction.

The inboard end of the lower control arm 66 is mounted to the frame 14 to form a first inboard joint 122 at a first location on the frame 14. The inboard end of the lower control arm 66 can be mounted to the frame 14 in a manner that permits the outboard end of the lower control arm 66 to move generally up and down with travel of the wheel 18 (FIG. 3). For example, the first inboard joint 122 can be a pivot joint or a ball joint. Thus, the first inboard joint 122 can pivotably couple the lower control arm 66 to the frame 14 so that the lower control arm 66 can pivot about one or more axes at the first inboard joint 122. The first inboard joint 122 can include a first inboard bushing (not specifically shown) providing compliance in the first inboard joint 122. The first inboard bushing (not specifically shown) can be configured to provide asymmetrical compliance such that the first inboard joint 122 can have more compliance in one direction than another direction.

The spring perch 110 is configured to support one end of the spring 42. The other end of the spring 42 either directly or indirectly engages a part of the frame 14 above the lower spring perch 110, such as through an upper spring perch (not specifically shown). In the example provided, the spring 42 is a helical coil spring that biases the knuckle 38 away from the frame 14 and resiliently supports the frame 14 relative to the knuckle 38. In the example provided, the spring 42 is located rearward of the kingpin axis of the suspension system 30, though other configurations can be used.

The camber link 70 includes an inboard end, an outboard end, and a rigid body that extends between the inboard and outboard ends of the camber link 70. The outboard end of the camber link 70 is mounted to the knuckle 38 to form a second outboard joint 126 located at a second location on the knuckle 38. The second location on the knuckle 38 is a different location than where the lower control arm 66 connects at the first location. In the example provided, the second location on the knuckle 38 is located proximate to a top of the knuckle 38 and is near, but slightly forward of the center axis 118 (FIG. 3), though other configurations can be used. The outboard end of the camber link 70 is mounted to the knuckle 38 such that the knuckle 38 can pivot relative to the camber link 70. For example, the second outboard joint 126 can be a pivot joint or a ball joint. Thus, the second outboard joint 126 can pivotably couple the camber link 70 to the frame knuckle 38 so that the camber link 70 can pivot about one or more axes at the second outboard joint 126. The second outboard joint 126 can include a second outboard bushing (not specifically shown) providing compliance in the second outboard joint 126. The second outboard bushing (not specifically shown) can be configured to provide asymmetrical compliance such that the second outboard joint 126 can have more compliance in one direction than another direction.

The inboard end of the camber link 70 is mounted to the frame 14 to form a second inboard joint 130 at a second location on the frame 14. The inboard end of the camber link 70 can be mounted to the frame 14 in a manner that permits the outboard end of the camber link 70 to move generally up and down with travel of the wheel 18 (FIG. 3). For example, the second inboard joint 130 can be a pivot joint or a ball joint. Thus, the second inboard joint 130 can pivotably couple the camber link 70 to the frame 14 so that the camber link 70 can pivot about one or more axes at the second inboard joint 130. The second inboard joint 130 can include a second inboard bushing (not specifically shown) providing compliance in the second inboard joint 130. The second inboard bushing (not specifically shown) can be configured to provide asymmetrical compliance such that the second inboard joint 130 can have more compliance in one direction than another direction. Accordingly, the length of the camber link 70 relative to the lower control arm 66 can control the camber angle of the wheel 18 (FIG. 3).

The toe link 74 includes an inboard end, an outboard end, and a rigid body that extends between the inboard and outboard ends of the toe link 74. The outboard end of the toe link 74 is mounted to the knuckle 38 to form a third outboard joint 134 located at a third location on the knuckle 38. The third location on the knuckle 38 is a different location than where the lower control arm 66 connects at the first location and is a different location than where the camber link 70 connects at the second location. In the example provided, the third location on the knuckle 38 is located proximate to a bottom of the knuckle 38 and forward of the center axis 118 (FIG. 3), though other configurations can be used. The outboard end of the toe link 74 is mounted to the knuckle 38 such that the knuckle 38 can pivot relative to the toe link 74. For example, the third outboard joint 134 can be a pivot joint or a ball joint. Thus, the third outboard joint 134 can pivotably couple the toe link 74 to the knuckle 38 so that the toe link 74 can pivot about one or more axes at the third outboard joint 134. The third outboard joint 134 can include a third outboard bushing (not specifically shown) providing compliance in the third outboard joint 134. The third outboard bushing (not specifically shown) can be configured to provide asymmetrical compliance such that the third outboard joint 134 can have more compliance in one direction than another direction.

The inboard end of the toe link 74 is mounted to the frame 14 to form a third inboard joint 138 at a third location on the frame 14. The inboard end of the toe link 74 can be mounted to the frame 14 in a manner that permits the outboard end of the toe link 74 to move generally up and down with travel of the wheel 18 (FIG. 3). For example, the third inboard joint 138 can be a pivot joint or a ball joint. Thus, the third inboard joint 138 can pivotably couple the toe link 74 to the frame 14 so that the toe link 74 can pivot about one or more axes at the third inboard joint 138. The third inboard joint 138 can include a third inboard bushing (not specifically shown) providing compliance in the third inboard joint 138. The third inboard bushing (not specifically shown) can be configured to provide asymmetrical compliance such that the third inboard joint 138 can have more compliance in one direction than another direction. Accordingly, the length of the toe link 74 relative to the lower control arm 66 can control the toe angle of the wheel 18 (FIG. 3).

The damper 46 includes a first damper end 142 and a second damper end 146. The first damper end 142 is mounted to the frame 14 at a fourth location on the frame 14 that is different than the first, second and third locations on the frame 14. The second damper end 146 is movable relative to the first damper end 142 and the damper 46 is configured to generally resist movement of the second damper end 146 relative to the first damper end 142. In the example provided, the damper 46 is an oil filled, piston-cylinder type damper. The first damper end 142 is fixedly coupled to the cylinder and the second damper end 146 moves the piston within the cylinder linearly along an axis of the damper 46. Axial movement of the piston relative to the cylinder is resisted by the fluid within the cylinder. Thus, the damper 46 is configured to impart reaction forces (i.e., a damping force) at the first and second damper ends 142, 146 that resists extension and contraction of the damper 46.

In the example provided, the damper 46 is an adjustable force damper such that the damping force can be selectively changed during operation of the vehicle. The damper 46 can be any suitable type of adjustable force damper. One type of adjustable force damper is one that incorporates a magnetorheological fluid (not shown) that changes viscosity based on electromagnetic input. Another type is one that incorporates adjustable internal flow orifices (not shown) for example. The damper 46 can be configured such that the damping force in the compressive direction is similar to the damping force in the extension direction or the damper 46 can be configured such that the compression and extension damping forces differ from each other. The compression and extension damping forces can be independently varied or the forces can be changed together. The damper 46 is in communication with the control module 50, as described in greater detail below, such that the control module 50 is able to adjust the damping forces of the damper 46.

The second damper end 146 is mounted to a component of the suspension system 30 such that vertical movement of the wheel 18 (FIG. 3) contracts or extends the damper 46. For example, when the vehicle 10 is moving and the wheel 18 moves upwards relative to the frame 14, the component of the suspension system 30 causes the second damper end 146 to move toward the first damper end 142 and the damper 46 resists the contracting with a damper force. Likewise, when the wheel 18 moves downward relative to the frame 14, the component of the suspension system 30 causes the second damper end 146 to move away from the first damper end 142 and the damper 46 resists the extension with a damping force.

In the example provided, the second damper end 146 is mounted to the knuckle 38 at a fourth location on the knuckle 38 that is different from the first, second, and third locations on the knuckle 38. In the example provided, the fourth location on the knuckle 38 is forward of the center axis 118 and between the second and third locations in the circumferential direction about the wheel axis 34. In the example provided, the fourth location on the knuckle 38 is on an end of a protrusion 150 that extends radially outward from the central portion of the knuckle 38 and is forward of the kingpin axis of the suspension system 30.

Figure 4:
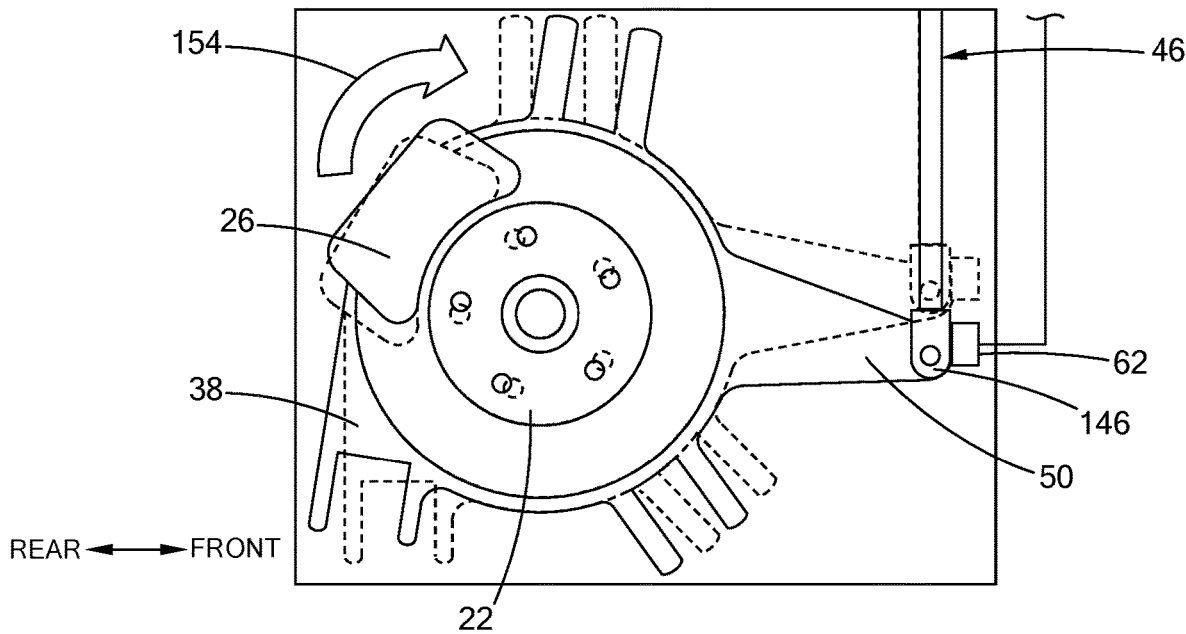
FIG. 4 is a side view of a portion of the suspension of FIG. 1, illustrating a change in caster angle of a knuckle of the suspension.

With specific reference to FIG. 4, the knuckle 38, hub 22, and brake 26 are illustrated in a first rotational position (shown in dashed lines) and a second rotational position (shown in solid lines) with the second damper end 146 in a corresponding first position (shown in dashed lines) and a corresponding second position (shown in solid lines). When the vehicle 10 is traveling in the forward direction and the brake 26 is applied, the momentum of the wheel 18 (FIG. 3) imparts a braking torque in a rotational direction 154 on the knuckle 38. In some situations, such as hard braking, the braking torque causes the knuckle to rotate generally in the rotational direction 154. Similarly, hard acceleration can result in rotation of the knuckle 38 in a rotational direction opposite the rotational direction 154 shown in FIG. 4.

In some suspensions, the braking torque causes rotation of the knuckle 38 about the rotational axis 34 of the wheel 18 (FIG. 3) as shown in FIG. 4. In other suspensions, the connection locations and connection types (e.g., ball joint, pivot joint, etc.) of the plurality of control arms (e.g., lower control arm 66, toe link 74, camber link 70) results in the braking torque causing rotation of the knuckle 38 about a different axis (e.g., an axis that can be parallel to but offset from the wheel's rotational axis). For simplicity, FIG. 4 shows the knuckle 38 rotating about the wheel axis 34, though it is understood that the actual rotation may not be exactly about the wheel axis 34.

The rotation of the knuckle 38 in the rotational direction 154 or the opposite rotational direction, causes a change in caster angle of the knuckle 38 and is known as caster windup. Typically, the resilient forces of the bushings (not specifically shown) at the joints 114, 118, 122, 126, 130, 134, 138 will return the knuckle 38 to its original rotational position (i.e., the original caster angle). However, the momentary change in caster angle can result in a momentary change in camber and/or toe. In some circumstances, the momentary change in camber and/or toe can result in undesirable handling of the vehicle.

Since the second damper end 146 is coupled to the knuckle 38 in a manner that causes extension or contraction of the damper 46 when the caster angle of the knuckle 38 changes, the damper force will generally resist rotation of the knuckle 38.

Returning to FIG. 3, the first sensor 54 is mounted to the vehicle frame 14, though other configurations can be used. The first sensor 54 is configured to detect a first characteristic of the vehicle 10 and to output a first signal to the control module 50 representative of the first characteristic. The first characteristic can include an acceleration of the vehicle 10, a deceleration of the vehicle 10, and/or a ride height of the vehicle 10.

In the example provided, the second sensor 58 is mounted to the damper 46, though other configurations can be used. The second sensor 58 is configured to detect a length of the damper 46 (e.g., a position of the second damper end 146 relative to the first damper end 142). The second sensor 58 is configured to output a second signal representative of the length of the damper 46 to the control module 50.

In the example provided, the third sensor is mounted to the knuckle 38, though other configurations can be used. The third sensor 62 is configured to detect a change in angular position of the knuckle 38. The change in angular position of the knuckle 38 can be relative to the frame 14 or another component such that the change is representative of a change in caster angle of the knuckle 38. Alternatively, the third sensor 62 can be configured to detect a change in angular position of another component (e.g., the second damper end 146, or one of the plurality of control arms) that correlates to the change in caster angle of the knuckle 38.

In the example provided, the control module 50 is supported by the vehicle frame 14, though other configurations can be used. The control module 50 is in electrical communication with the damper 46 and is able to output control signals to the damper 46 to adjust the damping rates (i.e., damping force) of the damper 46. The control module 50 can also be configured to receive input signals from the damper 46. The control module 50 is in electrical communication with the first, second, and third sensors 54, 58, 62 such that the control module 50 can receive input signals from the first, second, and third sensors 54, 58, 62. The input signals can be representative of vehicle characteristics detected by the sensors 54, 58, 62. The control module 50 can also receive input signals from additional sensors (not specifically shown) and can store characteristics of the vehicle internally or receive vehicle characteristics from another external source (not specifically shown) such as an external memory or other vehicle system that is external to the control module 50. Such stored or retrieved vehicle characteristics can include data on vehicle weight, ride height, spring rates, damping forces or damping rates, acceleration thresholds, braking thresholds, brake and acceleration pedal positions, user settings and preferences, wheel size, vehicle speed, preferred caster angles, preferred toe angle, preferred camber angle, steering position, and vehicle yaw, among other inputs.

The control module 50 is configured determine or calculate an actual or predicted change in caster angle of the knuckle 38 based on the detected or known characteristics of the vehicle 10. The control module 50 is configured to output control signals to the damper 46 to adjust the damper force based on the actual or predicted change in caster angle.

With specific reference to FIGS. 3 and 4, if the control module 50 determines that the caster angle is changing in the rotational direction 154 a greater amount than desired, the control module 50 will increase the damping force of the damper 46 in a manner that resists extension of the damper 46 and thus resists the rotation of the knuckle 38 in the rotational direction 154. In one configuration, the control module 50 also decreases the damping force in the opposite direction to assist in returning the knuckle 38 to the desired caster angle.

Similarly, if the control module 50 determines that the caster angle is changing in the rotational direction that is opposite the rotational direction 154 more than a desired amount, the control module 50 will increase the damping force of the damper 46 in a manner that resists compression of the damper 46 to resist the rotation of the knuckle 38. The control module 50 may also decrease the damping force in the rotational direction 154 to assist in returning the knuckle 38 to the desired caster angle.

In one configuration, the control module 50 can predict a change in caster angle before the actual change occurs and adjust the damping force accordingly to preemptively prevent the change in caster angle. For example, if the vehicle 10 is traveling at a certain speed and the control module 50 receives an input indicative that the vehicle 10 is about to brake quickly (e.g., a position of the brake pedal or a signal from an autonomous braking system of the vehicle), the control module calculates and predicts a change of caster angle will occur and adjusts the damping force based on that predicted caster angle change.

In one configuration, the control module 50 is configured to control the damper 46 to resist any change in caster angle away from a predetermined initial or static caster angle. In an alternative configuration, the control module 50 is configured to provide active caster angle control or tuning. In some dynamic situations, a specific amount of caster angle change may be desirable. For example, the desirable camber and toe characteristics during straight line braking can be different than braking while cornering. The control module 50 can be configured to actively control the damping force of the damper 46 to permit some caster windup until the caster angle is the desired angle and then resist further caster angle change until a different predetermined caster angle is desirable.

In the configuration where the bushings (not shown) at joints 114, 122, 126, 130, 134, 138 have less compliance in one rotational direction than the other, caster angle can be primarily controlled in one direction by the low compliance side of the bushings (not shown) and in the other direction by the control module 50 adjusting the damper force. For example, the bushings (not shown) can have less compliance in the rotational direction 154 than the opposite rotational direction. In this configuration, caster angle change in the rotational direction 154 is more limited by the lower compliance side of the bushings (not shown) and the control module 50 can adjust the damping force of the damper 46 to control caster angle change in the opposite rotational direction.

Figure 5:
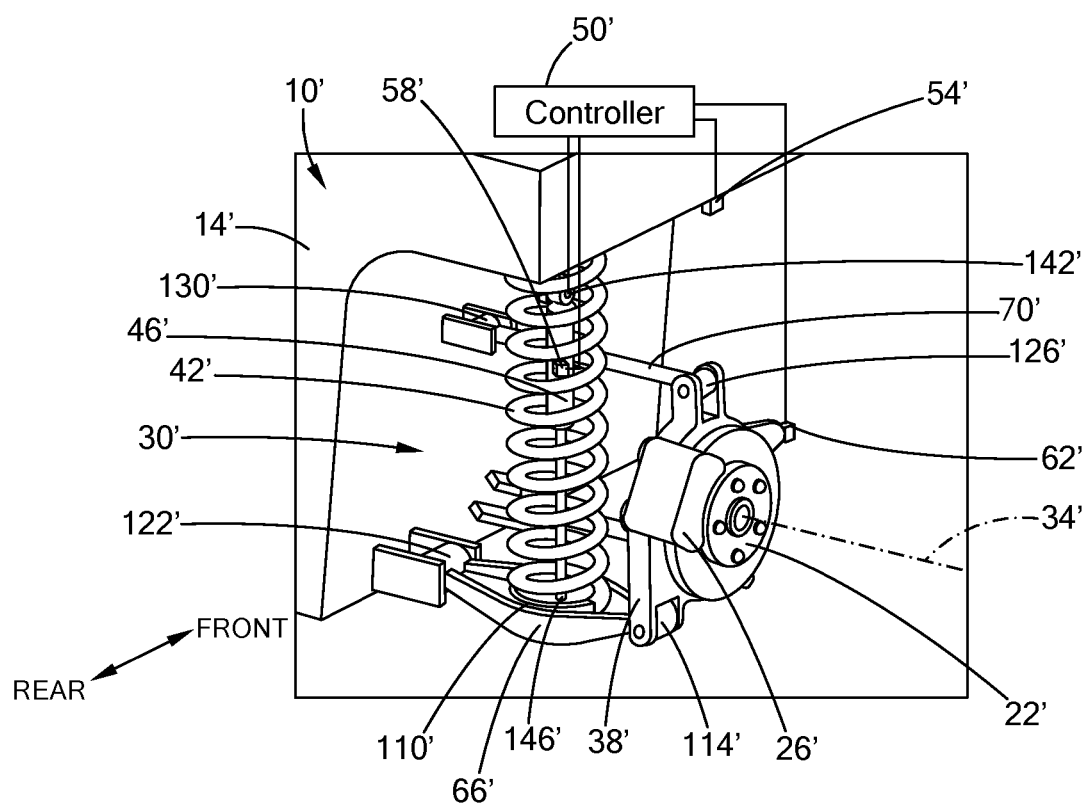
FIG. 5 is a front perspective view of a portion of a vehicle illustrating a suspension of a second configuration in accordance with the teachings of the present disclosure.

With additional reference to FIG. 5, a vehicle 10' of a second configuration is illustrated. The vehicle 10' is similar to the vehicle 10 (FIGS. 1-4) except as otherwise shown or described herein. Primed reference numerals in FIG. 5 refer to features that are similar to the features shown in FIGS. 1-4 and described above with the similar non-primed reference numerals. As such, only differences are described herein. In FIG. 5, the second damper end 146' is mounted to the lower control arm 66' and the lower control arm 66' is coupled to the knuckle 38' in a manner such that when the knuckle 38' rotates (e.g., as shown in FIG. 4), it causes extension or contraction of the damper 46'. In the example provided, the damper 46' is surrounded by the spring 42', though other configurations can be used. In the example provided, the damper 46' is located rearward of the kingpin axis of the suspension system 30, though other configurations can be used. The control module 50' can operate similar to the control module 50 to adjust the damper force to control the caster angle.

In an alternative configuration not shown, the second damper end 146 is mounted to a different one of the plurality of control arms (e.g., the camber link 70 or the toe link 74). The control arm is mounted to the knuckle 38 in a manner such that when the knuckle 38 rotates (e.g., as shown in FIG. 4), it causes extension or contraction of the damper 46. The control module 50 can operate as described above to adjust the damper force to control the caster angle.

In another alternative configuration not shown, a rigid integral link connects between two of the control arms (e.g., lower control arm 66, camber link 70, toe link 74). The integral link (not shown) is connected to the two control arms by bushings (not shown) that can have asymmetrical compliance. For example, the bushings (not shown) can have less compliance in the rotational direction 154 than the opposite rotational direction. In this configuration, caster angle change in the rotational direction is predominantly limited by the lower compliance side of the bushings (not shown) and the control module 50 can then adjust the damping force of the damper 46 to control caster angle change in the opposite rotational direction.

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

What is claimed is:

1. A suspension assembly for a vehicle having a frame, the suspension assembly comprising:
    a control arm pivotably coupled to the frame;
    a knuckle coupled to the control arm and adapted to support a wheel hub for rotation relative to the knuckle;
    a spring mounted between the frame and either the control arm or the knuckle;
    a damper having an adjustable damping force and including a first end mounted to the frame above a rotational axis of the wheel hub and a second end mounted below the first end such that a change in caster angle of the knuckle extends or contracts the damper; and
    a control module in communication with the damper and configured to adjust a damping force of the damper based on an actual or predicted change in caster angle of the knuckle, the control module being configured to increase the damping force in a direction that resists a change in the caster angle.

2. The suspension assembly of claim 1, wherein the damper is disposed either forward or rearward of a kingpin axis of the suspension assembly.

3. The suspension assembly of claim 1, wherein one of the spring and the damper is disposed forward of the kingpin axis and the other of the spring and the damper is disposed rearward of the kingpin axis.

4. The suspension assembly of claim 1, wherein the second end of the damper is mounted to the knuckle.

5. The suspension assembly of claim 1, further comprising a first sensor configured to detect a first characteristic of the vehicle, wherein the control module is configured to receive a first signal representative of the first characteristic from the first sensor and to adjust the damping force of the damper based on the first characteristic.

6. The suspension assembly of claim 5, wherein the first characteristic is one of an acceleration of the vehicle, a deceleration of the vehicle, and a change in angular position of the knuckle relative to the frame.

7. The suspension assembly of claim 5, wherein the control module is configured to calculate the caster angle based on the first signal and at least one second characteristic of the vehicle.

8. The suspension assembly of claim 7, wherein the at least one second characteristic is one of a ride height and a length of the damper.

9. The suspension assembly of claim 8, further comprising a second sensor configured to detect a length of the damper.

10. The suspension assembly of claim 1, further comprising a toe link and a camber link, the toe link including a first end mounted to the knuckle at a first location on the knuckle, a second end coupled to the frame, and a first rigid body extending between the first and second ends, the camber link including a third end mounted to the knuckle at a second location on the knuckle, a fourth end coupled to the frame, and a second rigid body extending between the third and fourth ends, the control arm being mounted to the knuckle at a third location on the knuckle.

11. The suspension assembly of claim 10, wherein the second end of the damper is mounted to one of the control arm, the toe link, and the camber link.

12. The suspension assembly of claim 1, further comprising a first bushing and a second bushing, the first and second bushings being mounted in a force transmission path between the knuckle and the frame and configured to provide the knuckle with a first degree of compliance in a first rotational direction and a second degree of compliance in a second direction, the first degree of compliance being greater than the second degree of compliance.

13. The suspension assembly of claim 12, wherein the first bushing is mounted to the knuckle and the second bushing is mounted to one of the control arm, a toe link, and a camber link.

14. A suspension assembly for a vehicle having a frame, the suspension assembly comprising:
a knuckle adapted to support a wheel hub for rotation relative to the knuckle;
a plurality of control arms, each control arm including a first end coupled to the frame, a second end coupled to the knuckle, and a rigid body extending between the first and second ends of the control arm;
a spring mounted between the frame and either the knuckle or one of the control arms;
a damper having an adjustable damping force and including a first end coupled to the frame above a rotational axis of the wheel hub and a second end mounted below the first end to either the knuckle or one of the control arms such that a change in caster angle of the knuckle extends or contracts the damper;
a first sensor configured to detect a first characteristic of the vehicle and output a first signal representative of the first characteristic; and
a control module in communication with the damper and the sensor, the control module configured to receive the first signal and determine an actual or predicted change in caster angle of the knuckle based on the first characteristic, the control module configured to increase a damping force of the damper in a direction that resists the change in caster angle.

15. The suspension assembly of claim 14, wherein the first characteristic is one of an acceleration of the vehicle, a deceleration of the vehicle, and a change in angular position of the knuckle relative to the frame.

16. The suspension assembly of claim 14, wherein the control module is configured to calculate the caster angle based on the first characteristic and at least one second characteristic of the vehicle.

17. The suspension assembly of claim 16, wherein the at least one second characteristic is one of a ride height and a length of the damper.

18. A method of controlling a caster angle of a knuckle of a vehicle, the vehicle including a damper having an adjustable damping force and including a first end coupled to a frame of the vehicle above a rotational axis of a wheel hub of the vehicle and a second end mounted below the first end to either the knuckle or a control arm of the vehicle such that a change in caster angle of the knuckle extends or contracts the damper, the method comprising:
detecting at a first sensor a first characteristic of the vehicle;
receiving at a control module a first input from the first sensor, the first input representative of the first characteristic;
determining at the control module an actual or predicted change in caster angle of the knuckle based on the first input; and
adjusting a damping force of the damper in a direction that resists the actual or predicted change in caster angle.

19. The method of claim 18, wherein adjusting the damping force of the damper includes increasing the damping force in a first direction that resists rotation of the knuckle away from a preferred caster angle and decreasing the damping force in a second direction that that permits rotational change of the knuckle toward the preferred caster angle.

20. The method of claim 18, wherein determining the actual or predicted change in caster angle includes calculating the caster angle based on at least one of an acceleration of the vehicle, a deceleration of the vehicle, a change in angular position of the knuckle, and a length of the damper.

* * * * *